Aug. 24, 1965                B. C. ARNOLD                3,202,016
                         TRACTOR IMPROVEMENTS
Filed April 11, 1962                              2 Sheets-Sheet 1
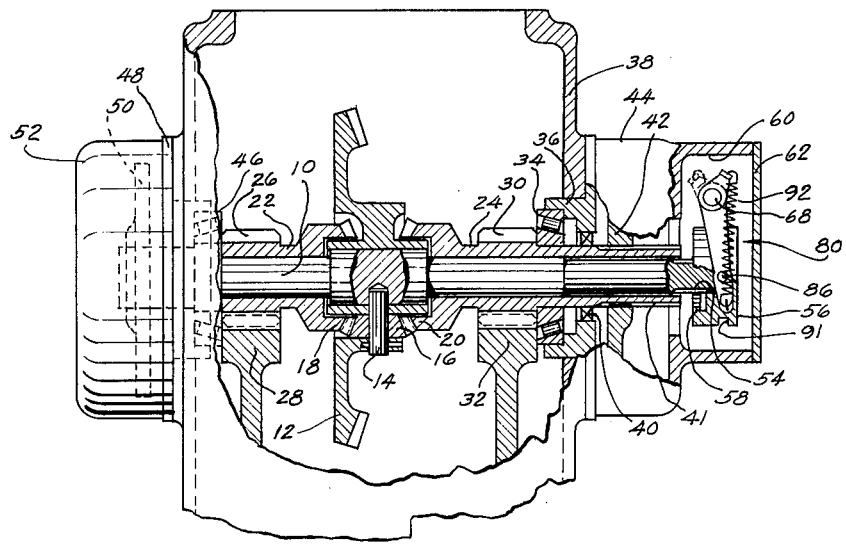
INVENTOR.
BRUCE C. ARNOLD
BY
Emerson B Donnell ATT'Y

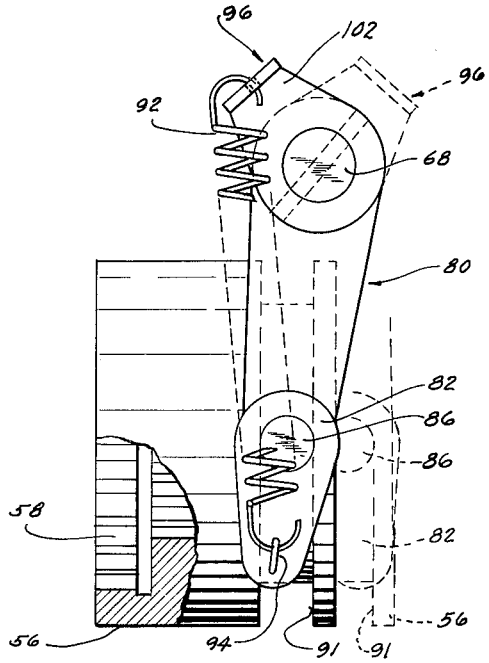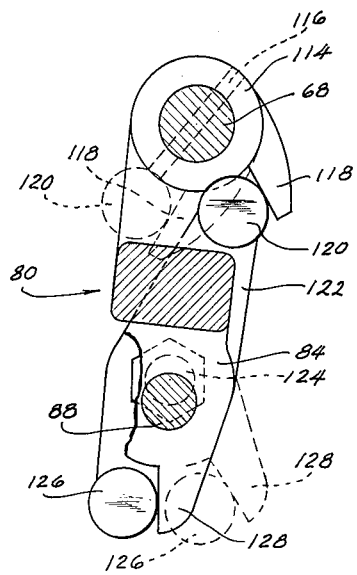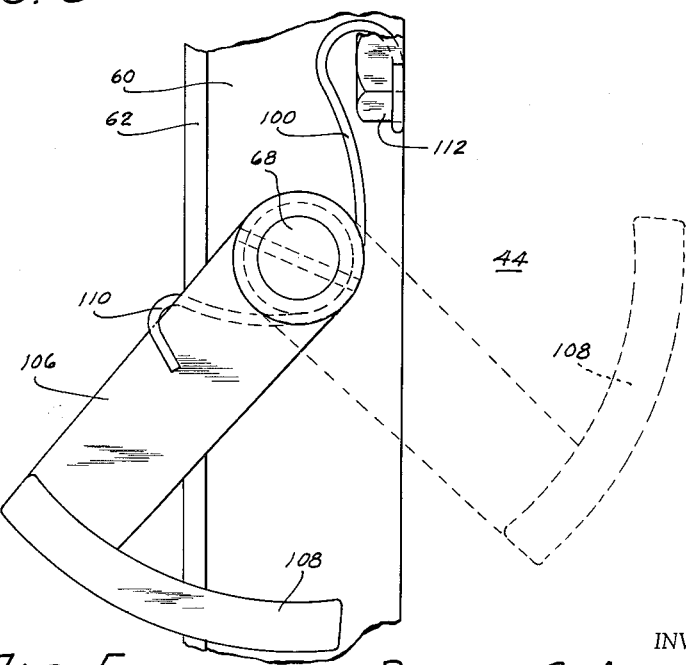

United States Patent Office 3,202,016
Patented Aug. 24, 1965

3,202,016
TRACTOR IMPROVEMENTS
Bruce C. Arnold, Milan, Ill., assignor to J. I. Case Company, Racine, Wis., a corporation of Wisconsin
Filed Apr. 11, 1962, Ser. No. 186,740
6 Claims. (Cl. 74—710.5)

The present invention relates to differential locks, and an object thereof is to generally improve the construction and operation of devices of this class.

In the use of tractors it sometimes happens that, when the ground is slippery in spots, better operation can be secured by eliminating the usual differential and operating in a manner as if the two traction wheels were connected by a single solid axle. This is true because the differential, neglecting losses, divides the engine torque equally between the traction wheels. Torque can be developed, of course, only against resistance, and if one wheel is momentarily on a slippery spot and has no traction, no torque can be applied to that wheel, and accordingly, by reason of the action of the differential, no torque can be applied to the other, and as a result no torque can be applied to either wheel, and no traction is possible. In other words, the tractor is helpless. However, if the traction wheels are tied together, the wheel momentarily having traction will receive torque, and if the load is not too great, the tractor may continue to operate, whereas, with the differential working, it cannot.

Accordingly, it is a further object of the invention to provide a novel and useful differential lock for tractors.

A further object is to provide such a lock which will engage automatically at periods of minimum load, upon actuation of a suitable control, but which may be positively released if necessary by forceful actuation of the control. Further objects will be apparent from the following specification and accompanying drawing in which, FIGURE 1 is a vertical, generally axial sectional view of a typical differential embodying the invention;

FIG. 2 is an enlarged right side elevation of a clutch and shifting mechanism constituting the major portion of the differential lock;

FIG. 3 is a sectional view on the line 3—3 of FIG. 2 enlarged;

FIG. 4 is a sectional view on the line 4—4 of FIG. 2 enlarged; and

FIG. 5 is a fragmentary front view of a control element on a scale comparable with FIGS. 3 and 4.

Similar reference characters have been applied to the same parts throughout the drawings and specification, which is to be taken as illustrative merely; the invention not being limited except as defined in the claims.

As seen in FIG. 1, the differential gear comprises primarily a shaft 10 on which is fixed a ring gear 12 so that it and shaft 10 always rotate with each other, and at the same speed. Gear 12 is fixed on shaft 10 by means of a pin 14 on which is journaled a differential pinion or gear 16, it being understood that more than one such pin and differential pinion are common and contemplated. Pinion 16 meshes with, and actuates gear portions 18 and 20 on sleeves 22 and 24, journaled on shaft 10 and providing the output elements of the differential. Sleeve 22 carries a gear 26 which meshes with a bull gear 28 connected with the usual axle, not shown, while sleeve 24 has a gear 30 which meshes with a bull gear 32 fixed on the other axle, in well-known manner, not necessary to illustrate and describe.

Sleeve 24 is carried in a bearing of suitable or well-known type 34, supported in a flanged bushing or cover plate 36 which is, in turn, carried in a portion 38 of the usual transmission housing of the tractor. Bushing 36 also carries an oil seal 40 of well-known type.

Sleeve 24 has splines 41 for some distance at its end remote from gear portion 20, and carries a brake element or disk 42 which is rotated by reason of rotation of sleeve 24 and its interlocking engagement with the splines 41 of sleeve 24. Brake element 42 is carried in a housing 44 fixed to bushing 36, the whole being firmly united with transmision housing 38 by any suitable means, not shown, there being suitable braking means within housing 44 not shown, cooperating with disk 42. As so far described, the differential is substantially conventional, and it will be understood that sleeve 22 is similarly supported in a bearing 46 carried in a bushing 48, a brake element 50, rotating with sleeve 22 within a housing 52.

Shaft 10 extends beyond the outer end of sleeve 24 (right end in FIG. 1), and has splines 54 on which is slidably mounted a clutch element 56, which is therefore in effect slidably keyed to shaft 10. Clutch element 56 has internal teeth 58 complementary to the splines 41 on sleeve 24. Clutch element 56 is slidable on splines 54 and when it is shifted to the left into the dotted position in FIG. 1, teeth 58 engage splines 41 and therefore lock shaft 10 and sleeve 24 together for dependent or synchronous rotation. With clutch element 56 in this position, the differential is disabled for the following reason. Sleeve 24, of course, is locked to shaft 10 and must rotate therewith at the same speed. Sleeve 22, however, although normally free to rotate in relation to shaft 10, cannot do so without rotating pinion 16 on pin 14. Pinion 16, however, cannot rotate without rotating sleeve 24 in relation to shaft 10. But this is not possible in view of the lock-up between shaft 10 and sleeve 24 through clutch element 56, as explained, and sleeve 22 as well as sleeve 24 must rotate with shaft 10.

It will now be apparent that the differential may be disabled to give the effect of a solid axle or tie-up between the two traction wheels at any time, by merely shifting clutch element 56 to the left, as seen in FIG. 1; whereas differential action may be restored by shifting clutch element 56 to the right. Suitable mechanism is provided for accomplishing this, as will appear.

Brake housing 44 has an auxiliary chamber 60 outwardly of the end of sleeve 24, enclosed by a cover plate 62. Journaled in bearings 64 and 66 FIG. 2, is a rockshaft 68 on which is journaled, in the present instance, a shipper generally designated as 80. Shipper 80 has arms or fingers 82 and 84 carrying, by means of pins 86 and 88 shifter shoes 89 and 90 engaging a groove 91 in the above-mentioned clutch element 56. Rocking of shipper 80, for example from the full line to the dotted position in FIG. 1 and back, will engage and disengage clutch element 56 with splines 41, and this is independent of any rocking of rockshaft 68.

Shipper 80 is shifted by means of a spring 92, best shown in FIG. 3, connected to finger 82 by means of a connection 94 at the extremity of finger 82 remote from shaft 68, and to an anchorage generally designated as 96, comprising in the present instance a collar 98, FIG. 2, fixed on shaft 68 as by a pin 100. Collar 98 has a plate or bracket 102 fixed thereto and providing a portion 104 spaced beyond the end of shaft 68 and having an opening in which spring 92 is secured. Rocking of shaft 68 will therefore carry the upper extremity of spring 92 to one side or the other of shaft 68, roughly in a direction parallel to, or in the general direction of the axis of shaft 10. In FIG. 1, spring 92 has been carried to the right of shaft 68, exerting a pull on shipper 80 to the right. At such time as there is a momentary cessation of load between sleeve 24 and shaft 10, the pull of spring 92 will be sufficient to disengage clutch element 56, as has occurred in FIG. 1. This is the normal position of the parts.

In FIG. 3, spring 92 has been carried to the left and in like manner, has shifted clutch element 56 to the left into position to lock sleeve 24 to shaft 10. The advantage of this type of operation is that, if there is a large difference in speed between shaft 10 and sleeve 24 such that engagement would cause a damaging shock, teeth 58 will ride the ends of the splines 41 and not engage under conditions which would produce such loading. However, as soon as the speeds become somewhere near equal, as will happen momentarily during operation, the resilient pressure of spring 92 will engage the clutch and accomplish the disabling of the differential.

Turning now to FIG. 5, shaft 68 extends, in the present instance forwardly, outside of housing 60, and has a control lever or pedal 106, having a portion 108 normally extending in front of brake housing 44. If the operator senses a need to disable the differential, he has merely to press portion 108, for example with his heel, from the dotted position in FIG. 5 to the full line position, whereupon he will set the parts in the relation shown in FIG. 3 so that the tractor will operate as with a solid axle. A spring 110 engaged with lever 106 is wound around shaft 68 and anchored in any suitable manner, as by contacting a nut 112 forming a part of the tractor structure. The tension or torsion of spring 100 will tend to return lever 106 to the dotted position as soon as released by the operator, so that the differential will go back into operation automatically.

As stated, the tension of above-mentioned spring 92 will disengage clutch element 56 at such times as the load on clutch element 56 is momentarily eliminated. Under some conditions, this may not come about, and therefore positive means is provided to disengage the clutch even under load. Referring to FIG. 4, shaft 68 has fixed thereon, a cam member 114, as by means of a pin 116, and which has a finger 118 arranged, in the position of the parts shown in FIG. 3, to contact a roller or tappet portion 120 on a lever arm 122, in turn fulcrumed on a pin 124 fixed in the wall of chamber 60 as by a nut 125, FIG. 2. Lever 122 has a roller or tappet 126 spaced from tappet 120 on the side of fulcrum pin 124 remote from roller 120. Roller 126 is in position to contact a follower portion 128 forming a part of above-mentioned fineger 84. Movement of finger 118 to the left by reason of clockwise rotation of shaft 68 will rock lever 122 in a counterclockwise direction, causing roller 126 to force finger 84 to the right, thus rocking shipper 80 in the proper direction to disengage clutch element 56. Therefore it is not necessary to depend upon the resilient pressure of spring 92 for the disengaging movement of clutch element 56. If the clutch stays engaged by reason of a continuing load, thus holding lever 106 in the full line position through the action of lever 122, a kick on lever 106 by the operator, forcing it back to the dotted position, will actuate finger 118 to positively shift shipper 80 through lever 122, and disengage clutch element 56 from sleeve 24. Thus, while the differential lock will work in a sense automatically, upon a signal from lever 106, it can be positively unlocked at any time by the exertion of force on lever 106.

The operation of the device is thought to be clear from the foregoing, and it is apparent that the mechanism shown will accomplish the objects of the invention, as hereinbefore stated.

What is claimed as new, and desired to be secured by Letters Patent of the United States is:

1. In a control for use in a differential gear of the type including a shaft, a ring gear fixed to a mid-portion of the shaft, a differential pinion journaled on said ring gear and a pair of driving sleeves journaled on said shaft, one at each side of said ring gear, and driven from said differential pinion, the combination including a plurality of teeth on one of said sleeves, a toothed clutch element slidably keyed on said shaft beyond the end of the last mentioned sleeve, and shiftable axially of said shaft into interlocking engagement with the teeth on said last mentioned sleeve, for locking up the differential gear, and means connected with said clutch element for shifting it into and out of engagement with said last mentioned sleeve.

2. In a control for use in a differential gear of the type having a pair of differentially rotatable parts one of said parts comprising a shaft, and the other comprising a driving sleeve the combination of a clutch element shiftable axially of said shaft and engageable with said shaft and with said driving sleeve to lock said shaft and said driving sleeve together for preventing the differential action, a shipper engaged with said clutch element and movable in the direction of the axis of said shaft, a spring anchorage supported for shifting movement in the direction of the axis of said shaft, means for shifting said spring anchorage in said direction, and a spring, stressed between said spring anchorage and said shipper in position to tend to shift, by reason of its stress, said shipper in a direction opposite to that in which said spring anchorage is shifted.

3. In a control for use in a differential gear of the type having a pair of differentially rotatable parts, one of said parts comprising a shaft, the combination of a clutch element shiftable axially of said shaft and engageable with said shaft and with the other rotatable part to lock said shaft and said other rotatable part together for preventing the differential action, a shipper engaged with said clutch element and movable in the direction of the axis of said shaft, a spring anchorage supported for shifting movement in the direction of the axis of said shaft, means for shifting said spring anchorage in said direction, a spring, stressed between said spring anchorage and said shipper in position to tend to shift, by reason of its stress, said shipper in a direction opposite to that in which said spring anchorage is shifted, and means interposed between said spring anchorage and said shipper, engageable with and movable by shifting of said spring anchorage in one direction, and by reason of such movement, engageable with and moving said shipper in the opposite direction.

4. In a control for use in a differential gear of the type having a pair of differentially rotatable parts, one of said parts including a central shaft, the combination of a housing, a clutch element in said housing, shiftable axially of said shaft and engageable with said shaft and with the other rotatable part for locking said differentially rotatable parts together for preventing the differential action of said differential gear, a rockshaft journaled in said housing, transverse to, and spaced from said central shaft, a shipper journaled on said rockshaft, and engaged with said clutch element for shifting it axially by reason of rocking of said shipper, means for rocking said rockshaft, a bracket on said rockshaft, a spring having one end connected to said bracket in position to be shifted in the general direction of the length of said central shaft upon rocking of said rockshaft, and stressed between said bracket and a portion on said shipper remote from said rockshaft, said bracket being so located that rocking of said rockshaft shifts said end of said spring from one side to the other of a line between said rockshaft and said portion on said shipper, whereby rocking of said rockshaft will cause said spring to exert resilient shifting pressure on said shipper to shift said clutch element by reason of rocking of said rockshaft.

5. In a control for use in a differential gear of the type having a pair of differentially rotatable parts including a central shaft and a clutch element shiftable axially of the shaft for locking said parts together for locking up the differential gear, the combination of a housing for said clutch element, a rockshaft journaled in the housing transverse to and spaced from said central shaft, a shipper journaled on the rockshaft and engaged in shifting relation with said clutch element, and means for rocking said shipper for shifting said clutch element including means for rocking said rockshaft, a bracket on said rockshaft, a tension spring having one end connected to said shipper at a point remote from said rockshaft and the other end connected with said bracket at a point such that rocking of said rockshaft shifts the second mentioned end of said spring from one side to the other of a line between said rockshaft and said point where said spring is connected to said shipper, whereby resilient pressure will be exerted by said spring tending to rock said shipper by reason of rocking of said rockshaft, a cam member on said rockshaft, a lever journaled in said housing and extending from said cam member to a point adjacent said shipper spaced from said rockshaft, means on said lever engaged by said cam member positioned to receive motion from said cam member by reason of rocking of said rockshaft in one direction, and means on said lever positioned to engage said shipper at a point spaced from said rockshaft, upon motion of said lever imparted thereto by said cam means, to rock said shipper and shift said clutch element independently of said spring when said rockshaft is rocked in said one direction.

6. In a control for use in a differential gear of the type including a shaft, a ring gear fixed to a mid-portion of the shaft, a differential pinion journaled on said ring gear and a pair of driving sleeves journaled on said shaft, one at each side of said ring gear, driven from said differential pinion, said driving sleeves having splined portions outwardly of said differential pinion, and brake elements carried on said splined portions, the combination including a plurality of teeth on said splined portions, one of said splined portions extending beyond its respective brake element on the side opposite said differential pinion, a toothed clutch element slidably keyed on said shaft beyond the end of the last mentioned splined portion, and shiftable axially of said shaft into interlocking engagement with the teeth on said last mentioned splined portion beyond said brake element, for disabling the differential action of said differential gear, and means connected with said clutch element for shifting it into and out of engagement with said last mentioned splined portion.

References Cited by the Examiner

UNITED STATES PATENTS

| | | | |
|---|---|---|---|
| 1,540,247 | 6/25 | Bowman. | |
| 2,306,545 | 12/42 | Kummich | 74—710.5 X |
| 2,450,364 | 6/49 | Foster | 192—89 |
| 2,832,233 | 4/58 | Allgaier et al. | 74—710.5 X |

DON A. WAITE, *Primary Examiner.*

BROUGHTON G. DURHAM, *Examiner.*